United States Patent
Ikezawa et al.

[11] Patent Number: 6,061,123
[45] Date of Patent: May 9, 2000

[54] LENS METER

[75] Inventors: Yukio Ikezawa; Eiichi Yanagi; Yasufumi Fukuma; Takeyuki Kato, all of Tokyo, Japan

[73] Assignee: Kabushiki Kaisha Topcon, Tokyo, Japan

[21] Appl. No.: 08/937,182

[22] Filed: Sep. 29, 1997

[30] Foreign Application Priority Data

Sep. 30, 1996 [JP] Japan .................................. 8-259170

[51] Int. Cl.⁷ .................................................. G01B 9/00
[52] U.S. Cl. ........................................... 356/124; 356/127
[58] Field of Search ............................ 356/124, 125–127

[56] References Cited

U.S. PATENT DOCUMENTS

| | | | |
|---|---|---|---|
| 5,414,505 | 5/1995 | Ikezawa et al. | 356/124 |
| 5,521,700 | 5/1996 | Kajino et al. | 356/124 |
| 5,525,836 | 6/1996 | Minix | 356/124 |

FOREIGN PATENT DOCUMENTS

| | | |
|---|---|---|
| 62-227114 | 10/1987 | Japan . |
| 63-113419 | 5/1988 | Japan . |
| 2-186235 | 7/1990 | Japan . |
| 9-33396 | 2/1997 | Japan . |

Primary Examiner—Frank G. Font
Assistant Examiner—Roy M. Punnoose
Attorney, Agent, or Firm—Finnegan, Henderson, Farabow, Garrett & Dunner, L.L.P.

[57] ABSTRACT

A lens meter is provided in which a measurement light beam emitted from a light source (21) is projected onto a lens (L) to be inspected, an amount in travel of the measurement light beam which has passed through the lens (L) is then detected by a TV camera (34), and the refractive characteristics of the lens (L) based on the detection result are computed by an arithmetic and control circuit (35) and are displayed by a display unit (3). In the lens meter, the arithmetic and control circuit (35) computes cylindrical power of a distance portion (40) of the lens (L) in consideration of cylindrical power and a direction of a cylindrical axis from the detection result of the TV camera (34), and then computes cylindrical power in distortion areas (42, 43) except the distance portion (40), a progressive portion (41), and a near portion (41') in consideration of the cylindrical power and the direction of the cylindrical axis. After that, the arithmetic and control circuit (35) subtracts the cylindrical power of the distance portion (40) from the cylindrical power of the distortion areas (42, 43). Based on the obtained subtraction results, the arithmetic and control circuit (35) computes boundary lines (44, 45) between the distance, progressive, and near portions (40, 41, 41') and the distortion areas (42, 43) except these portions, and allows the display unit (3) to display the boundary lines (44, 45).

4 Claims, 12 Drawing Sheets

LENS METER

BACKGROUND OF THE INVENTION

1. Field of the Invention

This invention relates to a lens meter for measuring the refractive characteristic value at each position of a lens to be inspected and displaying an image of a refractive state diagram from the obtained refractive characteristic values.

2. Description of the Prior Art

Conventionally, there has been known a lens meter in which a measurement light beam emitted from a light source is made incident upon a lens to be inspected, an amount in travel of the light beam which has passed through the lens is then detected by a photosensor, arithmetic control means then calculates the refractive characteristics at each position of the lens from the detection result, and the refractive characteristics of the spherical power, the cylindrical power, etc., of the lens are obtained from the calculated refractive characteristics.

In recent years, however, a progressive power lens (varifocal lens), a distance aspherical lens, and the like, have spread widely as an eyeglass lens. Since the refractive characteristics of the spherical power, the cylindrical power, or the like, of the eyeglass lens are not uniform, unlike those of a spherical lens, it has been impossible for the conventional lens meter to simultaneously measure the refractive characteristics in each position of the eyeglass lens (the lens to be inspected).

However, there has been developed a lens meter which is capable of measuring the refractive characteristics of such an eyeglass lens (see Japanese Laid-Open Patent Publication No. Hei 9-33396). This lens meter comprising a light source, a two-dimensionally arranged microlens array used as an optical member for forming many measurement light beams, and a two-dimensional sensor, such as an area CCD (a charge-coupled device), in order of mention, in which a light beam emitted by the light source which has passed through the microlens array is made many measurement light beams, and thereafter the two-dimensional sensor receives many measurement light beams which has passed through the eyeglass lens (the lens to be inspected), and an arithmetic control circuit processes the output (measured data) given by the two-dimensional sensor. Thereby, the lens meter is capable of measuring the power distribution at each position of the surface of the lens in a short time and is capable of being constructed at a less cost because the number of light sources to be required is one and a mechanical driving portion is not required.

In this lens meter, in a case where the refractive characteristics of an eyeglass lens, such as a progressive power lens, are measured, as shown in FIG. 14, the image of equal power distribution lines 62a, 62b, 62i of the spherical power can be displayed, and as shown in FIG. 15, the image of equal power distribution lines (a1, a2, . . . ai), (a1', a2', . . . ai') of the cylindrical power can be displayed.

Conventionally, however, as shown in FIGS. 14 and 15, the image display of the refractive characteristics of the spherical power or the cylindrical power is made separately, and thus the positional relationship or the refractive characteristics of a distance portion, a near portion, a progressive portion, etc., cannot be easily detected.

A progressive power lens is roughly divided into a distance portion, a near portion, a progressive belt portion, and a sideward portion. The distance portion literally represents a part where one's gaze crosses when one has a distance view. This part occupies a wide area in the substantially upper-half part of a lens and the power of the part is uniform. The progressive belt portion represents an area where the power becomes continuously larger from the upper part to the lower part. The near portion represents an area where the power is relatively large and uniform. The sideward portion represents an area where astigmatism is generated because of the configuration of the progressive lens, and the amount of the astigmatism usually becomes larger toward the edge. When an object is viewed through this area, the viewed object looks distorted.

Even though there is used a lens in which the power of the distance portion is equal to the addition power (the difference between the near power and the distance power), a feeling which one has while wearing eyeglasses varies largely with the area of the distance portion, the width or the increase rate of the progressive belt, the area of the near portion, or the like, and thus manufacturers have come up with lenses having various characteristics. Therefore, a manufacturer by which a lens has been produced and a type of the lens can be recognized from the information of the areas, so that a progressive lens according to needs or a lifestyle of a patient can be selected.

However, any clear boundaries between each area do not exactly lie in the strict sense of the word, and thus each position where variations in power exceeds a certain value is displayed as a boundary. For example, in a case where a boundary between the progressive belt portion and the sideward portion is determined, an inside area and an outside area of a line between points where astigmatism generated according to the configuration of the progressiveness exceed a certain value (e.g., 0.25D) are regarded as the progressive belt portion and the sideward portion, respectively.

In a case where the eye of a patient does not have astigmatism, equal cylindrical power lines on which each cylindrical power is equal are shown in FIG. 15 because the cylindrical power is not treated, for example, the lines ai, ai' are regarded as boundary lines between the areas. On the other hand, in a case where the eye does not have astigmatism, the entire surface of the lens has the cylindrical power because the back surface of the lens is usually regarded as a trick surface in order to treat the cylindrical power. In this case, since the astigmatism generated according to the configuration of the progressiveness is added to the treated cylindrical power for the observation in the sideward portion, the astigmatism according to the configuration of the progressiveness is nullified by the treated cylindrical power, especially in a case where the treated astigmatic power is large. In this case, therefore, as mentioned above, even though equal cylindrical power lines are displayed, as shown in FIG. 16, the lines ai, ai' do not correspond to the boundary lines between the areas and a position (the boundary of the sideward portion) from which distortion is recognized cannot be detected. Further, the astigmatic power and the astigmatic axial angle vary with the patient on treatments of the astigmatism, and the number of the combination thereof becomes extremely large. Therefore, a manufacturer cannot place the distribution characteristics in all conditions on a catalogue, and thus the distribution characteristic curves in a case where there are not any astigmatic treatments are usually placed on the catalogue. As a result, in a case where components of the treated cylindrical power are included in a measurement result, it is impossible to compare the measured curves with the distribution characteristic curves shown in the catalogue, so that the manufacturer and the type of the lens becomes difficult to recognize.

Since measured values in the distance portion do not include the astigmatism according to the configuration of the progressiveness differently from those of the sideward portion, the cylindrical power measured in the distance portion shows cylindrical power treated in order to correct the astigmatism of the patient. On the other hand, since the cylindrical power is added to the astigmatism generated according to the configuration of the progressiveness for measurement in the sideward portion, there has been disclosed a method by which the cylindrical power measured in the distance portion in advance is memorized, and then the memorized cylindrical power in the distance portion is subtracted from measured values of the cylindrical power in each position (the progressive belt portion, the near portion, and the sideward portion) below the distance portion.

According to this method, however, subtraction of the values of the cylindrical power is simply taken without axial angles' being considered. The axial angles of principal meridians of the cylindrical power which have been obtained in the measurement of the distance portion, that is, which have been treated in order to correct the astigmatism of the patient, are treated according to the astigmatic axial angles of the patient's eyes, and become uniform over the entire lens surface. In contrast, the axial angles of principal meridians of the astigmatism generated according to the configuration of the progressiveness vary with the part of the lens, and thus do not relate to the treated axial angles in the least. However, values to be obtained in practical measurement correspond to values including both the one cylindrical power and the other cylindrical power added thereto. The relational equations between the powers D', D" to be practically observed are shown in the following.

$$D'=(D_1+D_2+R)/2$$

$$D''=(D_1+D_2-R)/2$$

$$R^2=D_1^2+D_2^2+2 D_1 D_2 \cos 2\gamma$$

Herein, reference characters $D_1$, $D_2$, and $\gamma$ denote the treated cylindrical power, the cylindrical power generated according to the configuration of the progressiveness, and the angle between the axes of the cylindrical powers, respectively.

Although the cylindrical power C to be practically measured is obtained from C=D'-D", the true value of the cylindrical power according to the configuration of the progressiveness $D_2$ cannot be obtained if $C-D_1$ is simply used with the axial angle's being neglected. Therefore, even though the equal cylindrical power lines are displayed according to the values obtained with the axial angle's being neglected, the displayed lines do not correspond to the true lines.

SUMMARY OF THE INVENTION

Hence, an object of the present invention is to provide a lens meter which is capable of easily detecting a position or a configuration of a progressive portion and a near portion, and variations in the refractive characteristics of the progressive portion according to an image display even in a case where the treated cylindrical power is large.

In order to achieve this object, a lens meter according to the present invention comprises an illumination optical system for projecting a beam of measurement light onto a lens to be inspected, a light receiving optical system which is provided with a photosensor for detecting an amount in travel of the measurement beam which has passed through the lens, a display unit for displaying the refractive characteristics from a detection result of the light receiving optical system, and arithmetic control means for obtaining cylindrical refractive characteristic values in a distance portion of the lens in consideration of the cylindrical power and the direction of a cylindrical axis from a detection result of the photosensor, obtaining a cylindrical refractive characteristic value in a distortion area except the distance portion, a progressive portion continuing to the distance portion, a near portion, and the like of the lens in consideration of the cylindrical power and the direction of the cylindrical axis, subtracting the cylindrical refractive characteristic value in the distance portion from the obtained cylindrical refractive characteristic value in the distortion area, obtaining a boundary line between the distance portion, the progressive portion continuing to the distance portion, and the near portion, and the distortion area except these portions from the subtraction value, and allowing the display unit to display the boundary line.

Further, the arithmetic control means is also capable of obtaining the spherical power distribution in the progressive portion and the near portion from the detection result, and allowing the display unit to display the equal power lines of the spherical power distribution and the boundary line with overlapping to each other in the progressive portion and the near portion.

Further, the arithmetic control means is also capable of obtaining the outer diameter of the lens from the output of the photosensor, and allowing the display unit to display the outer diameter of the lens, the equal power lines of the spherical power distribution, and the boundary line with overlapping to each other.

Further, the photosensor has a width of not being too small to receive the beam from the progressive portion and the circumferential part of the progressive portion of the lens.

DESCRIPTION OF THE PREFERRED EMBODIMENT

An embodiment of the present invention will be described hereunder with reference to the attached drawings.

Figure 2:
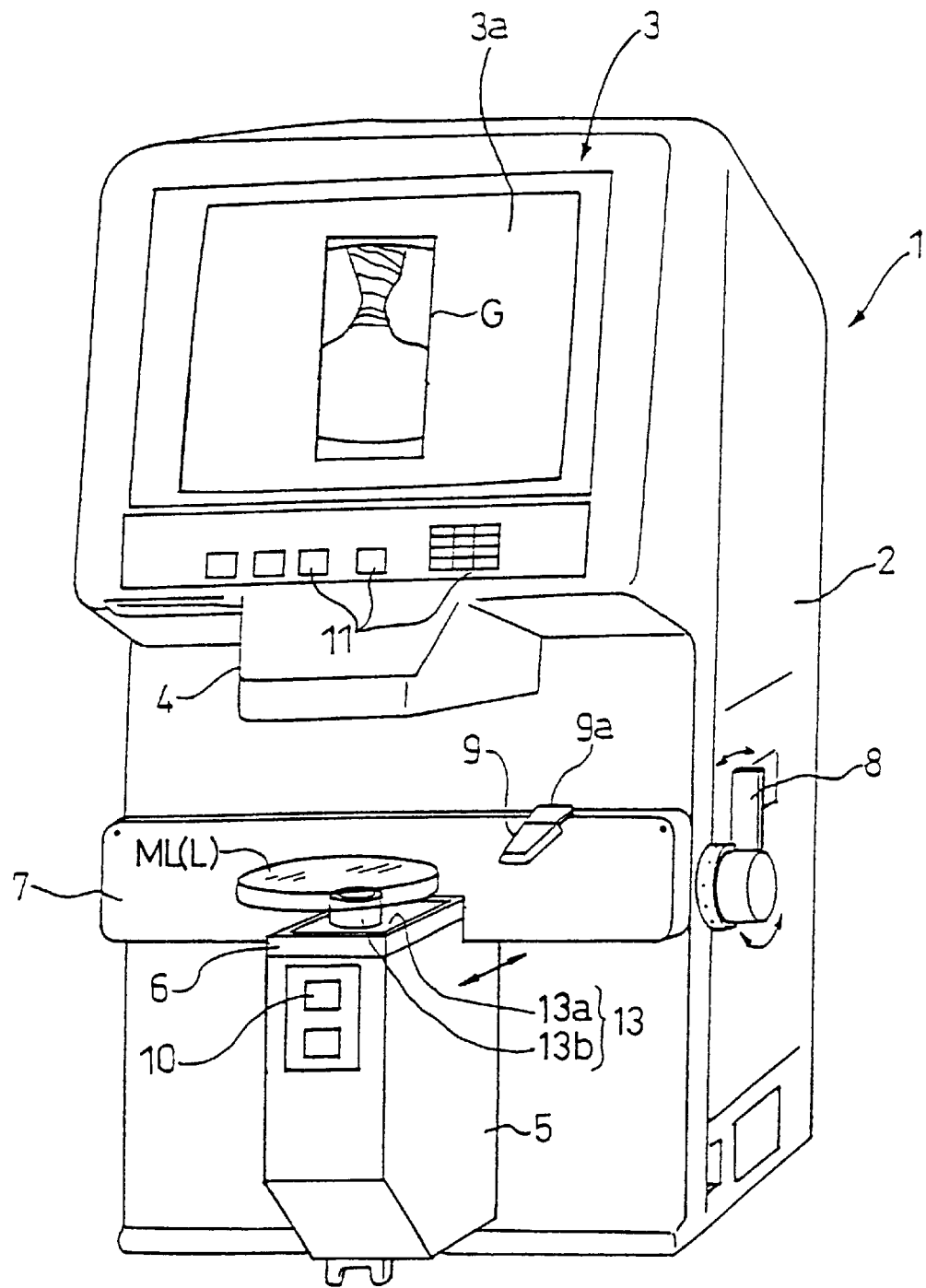
FIG. 2 is a schematic perspective view of the lens meter including the optical system shown in FIG. 1.

In FIG. 2, reference character 1 denotes a lens meter according to the present invention, reference character 2 denotes a main body of the lens meter 1, reference character 3 denotes a display unit, such as a CRT or a liquid-crystal display, which is formed in the upper part of the main body, reference character 3a denotes a display screen of the display unit 3, reference character 4 denotes an upper optical-member-disposition portion disposed on the front side of the main body 2, reference character 5 denotes a lower optical-member-disposition portion disposed on the front side of the main body 2 and below the upper optical-member-disposition portion 4, and reference character 6 denotes a lens-receiving table disposed on the upper end of the lower optical-member-disposition portion 5.

Reference character 7 denotes a lens applier which is held between the portions 4, 5 and on the front side of the main body 2 and whose forward-and-backward movement can be adjusted, and reference character 8 denotes a lever for a lens-applier operation which is held to be turnable forward and backward on the side of the main body 2. The forward-and-backward movement of the lens applier 7 is adjusted by a forward-and-backward turn of the lever 8. A movement position of the lens applier 7 in the front and back directions (in directions Y) is measured by a potentiometer (not shown).

A slider 9a is held on the upper edge of the lens applier 7 and can move in right and left directions. A nose-applier holding member 9 is held on the slider 9a and can turn in up and down directions. A position of the slider 9a in right and left directions (in directions x) is also measured by a potentiometer (not shown). The nose-applier holding member 9 is pressed upward by the force of a spring (not shown), and an upward turn thereof in the horizontal position is regulated. Herein, reference character 10 denotes a switch for switching modes, and reference character 11 denotes a switch for starting measurement.

Figure 1:
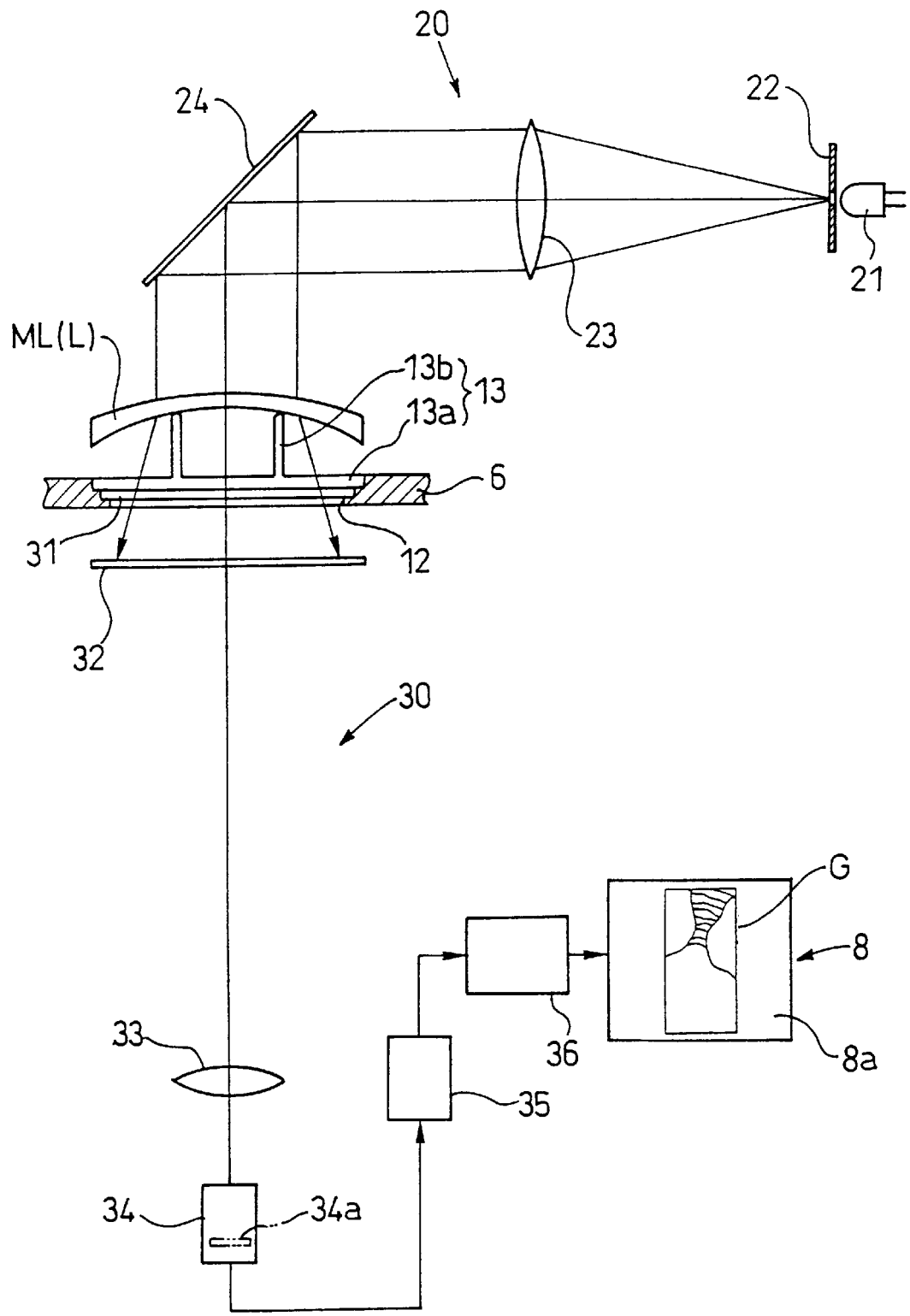
FIG. 1 is an explanatory diagram showing an optical system of a lens meter according to the present invention.

As shown in FIG. 1, a step-cut attachment opening 12 having a large diameter is formed in the lens-receiving table, and a lens platform 13 used as a light guiding portion (a light transmitting portion) is attached to the attachment opening 12. The lens platform 13 consists of a flat transparent plate 13a which is made of transparent glass, transparent resin, or the like, a projection 13b (distance determining means) for holding a lens, which projects from the central part of the upper surface of the transparent plate 13a.

Figure 5:
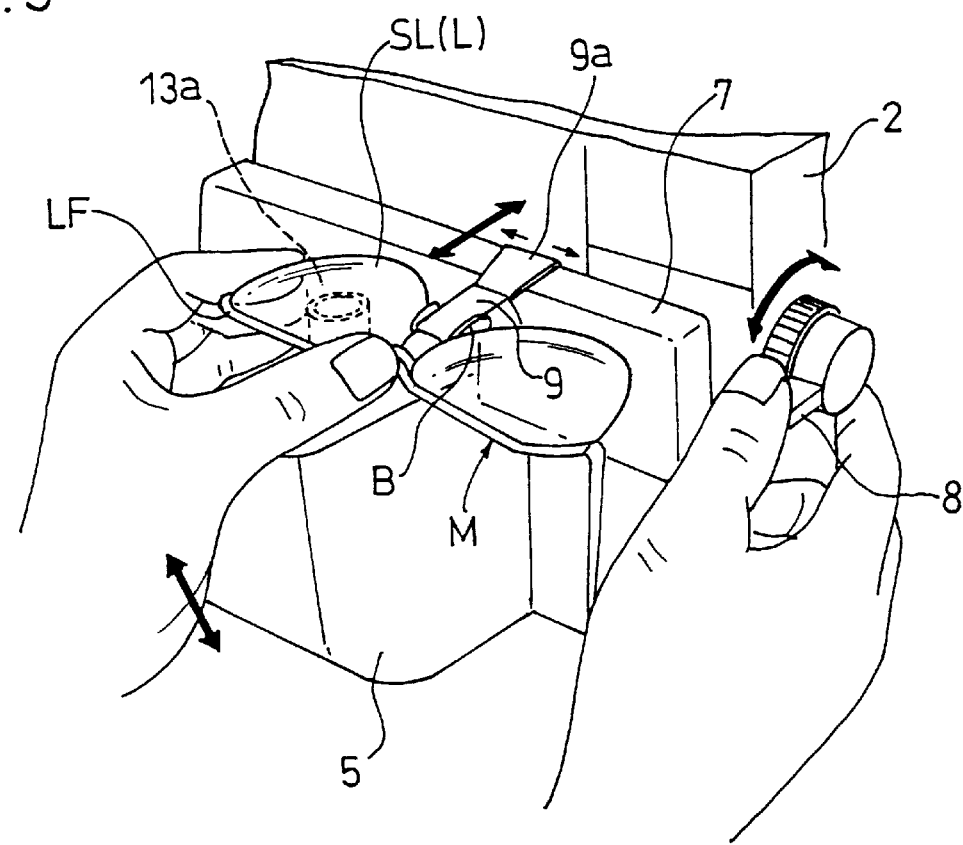
FIG. 5 is a perspective view of the lens meter shown in FIG. 2 and eyeglass lenses framed in a spectacle frame, showing a state in which the refractive characteristics of the eyeglass lenses are measured by the lens meter.

As shown in FIG. 2, a circular lens ML to be cut, that is, an eyeglass lens which has been formed by grinding an uncut lens (a lens blank) or a lens to be cut into an eyeglass lens configuration, or a lens L to be inspected such as an eyeglass lens SL framed by a spectacle frame (a lens frame) LF of spectacles (eyeglasses) M, as shown in FIG. 5, is set on the projection 13b. When the framed eyeglass lens is set on the projection 13b, as shown in FIG. 5, nose-appliers B of the spectacle frame LF are engaged with the nose-applier holding member 9, thereafter the nose-applier holding member 9 is moved in right and left directions and downward via the slider 9a, and the eyeglass leases SL are then held on (are brought into contact with) the projection 13b.

A measuring optical system shown in FIG. 1 is disposed in the main body 2 of the lens meter 1. The measuring optical system is made up of an illumination optical system 20 and a light receiving optical system 30. In the illumination optical system 20, optical members of a light source 21, a diaphragm 22, a collimator lens 23, a reflecting mirror 24, and the like are disposed in order of mention.

In the light receiving optical system 30, optical members of a porous diaphragm plate (means for generating many parallel measurement beams of light) 31 used as a pin hole plate, a screen 32, a relay lens 33, a TV camera 34, and the like are disposed in order of mention.

A part of the illumination optical system 20 is disposed inside of the upper optical-member-disposition portion 4, and a part of the light receiving optical system 30 is disposed inside of the lower optical-member-disposition portion 5.

Figure 4:
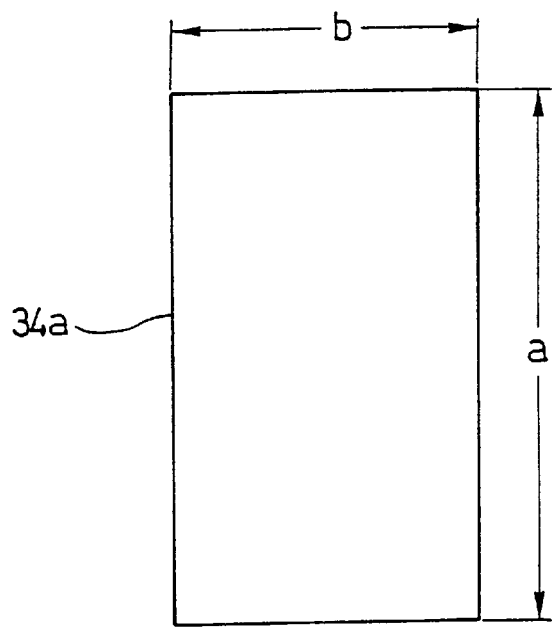
FIG. 4 is an explanatory diagram showing an area CCD of a TV camera in FIG. 1.

In FIG. 1, reference character 34a denotes an area CCD (a two-dimensional CCD) of a TV camera 34, that is, a two-dimensional photosensor. As shown in FIG. 4, the area CCD 34a has a size of a mm×b mm, that is, its length in up and down directions is larger than its width in right and left directions, which allows only a part (a progressive portion and its circumferential portion mentioned later) of the lens L to be measured. Thereby, the time which is taken for the measurement can be shortened to the minimum required. Further, a mm×b mm, the side of the area CCD 34a, is designed to be 55 mm×35 mm in this embodiment, however, the side a mm×b mm is not always limited to 55 mm×35 mm. In short, the side a mm×b mm may be a size in which the lens L can be measured not in the entire part of the lens L but in the circumferential portion including the progressive portion thereof (mentioned later).

Figure 3:
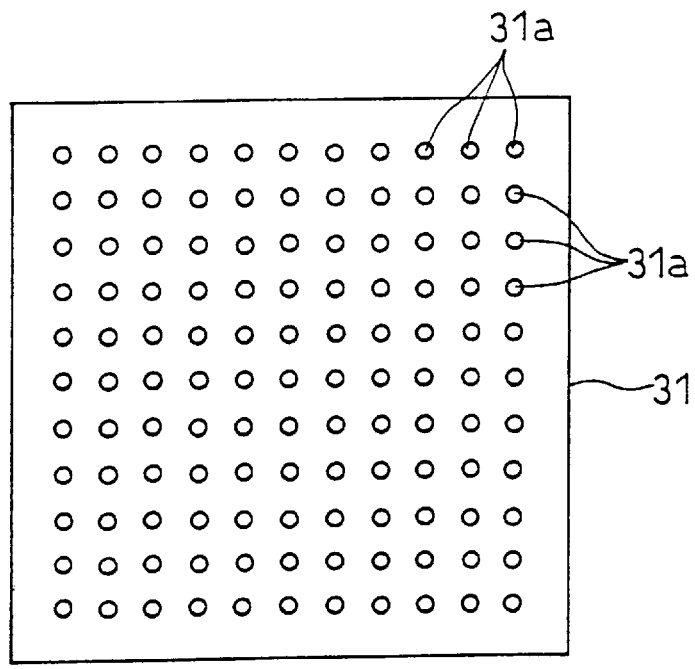
FIG. 3 is an explanatory diagram showing a porous diaphragm plate shown in FIG. 1.

In this embodiment, the porous diaphragm plate 31 having a quadrate shape is shown in FIG. 3, however, it is not always limited to this. In short, it may also have a long-strip shape similarly to that of the area CCD 34a. In this case, the area CCD 34a may also have the same size and the same configuration as mentioned above, and may also have a quadrate shape.

Figure 12:
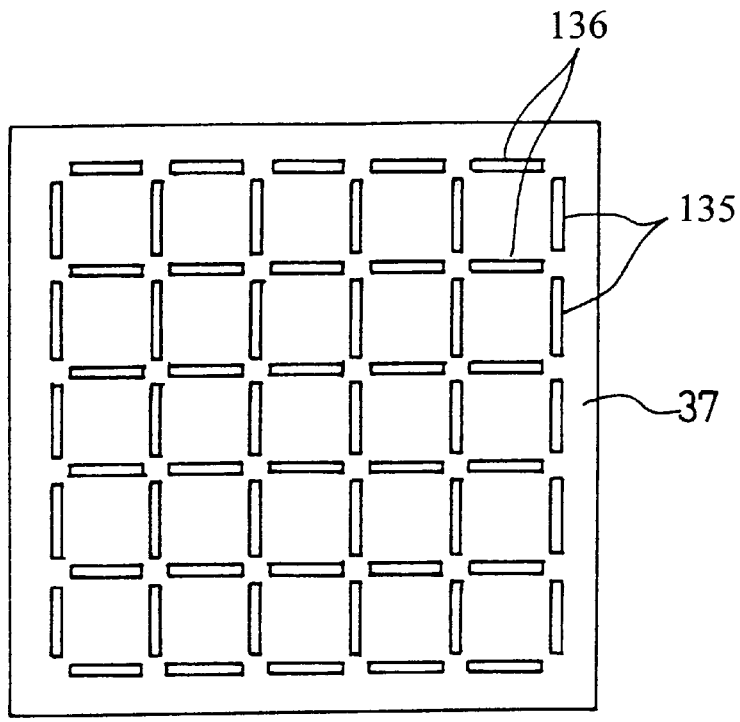
FIG. 12 is a plan view of another example of means for generating many parallel measurement beams of light.
Figure 13:
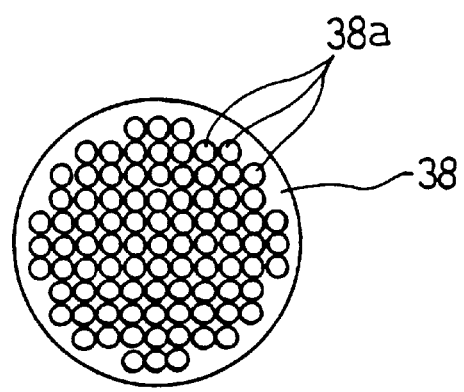
FIG. 13 is a plan view of another example of means for generating many parallel measurement beams of light.
Figure 14:
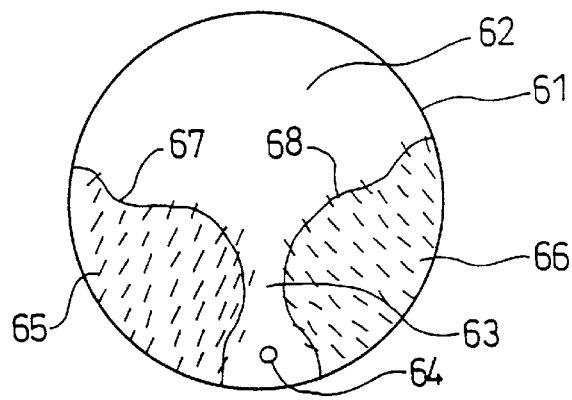
FIG. 14 is an explanatory diagram showing the distance portion, the progressive portion, or the like, of the lens.
Figure 15:
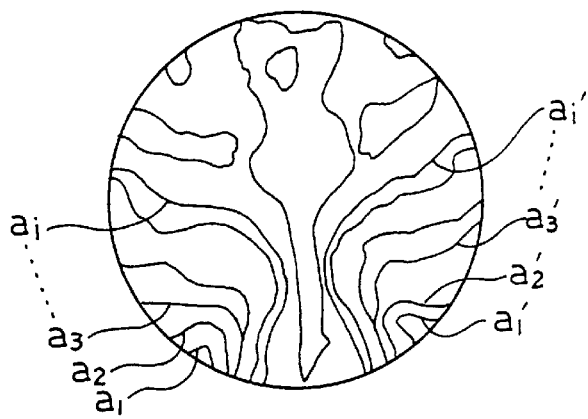
FIG. 15 is an explanatory diagram showing a cylindrical power distribution in a case where the cylindrical power of the lens is not large.
Figure 16:
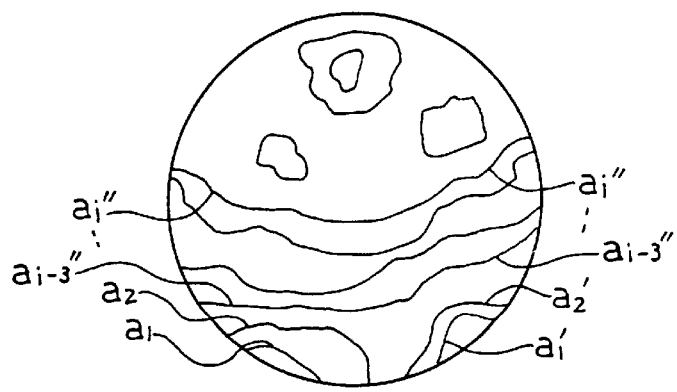
FIG. 16 is an explanatory diagram showing a cylindrical power distribution in a case where the cylindrical power of the lens is large over the whole area thereof.

Further, as shown in FIG. 3, the porous diaphragm plate 31 has many minute diaphragm holes 31a which have been disposed two-dimentionally and crosswise at equal pitches. The number of the minute diaphragm holes 31a is, for example, approximately 1000. In this embodiment, the porous diaphragm plate 31 is used as the means for generating many parallel measurement beams of light. However, it is not always limited to the porous diaphragm plate 31. For example, as shown in FIG. 12, instead of the porous diaphragm plate 31, a porous diaphragm plate 37 in which many longitudinal slit holes 135 and many lateral slit holes 136 have been disposed crosswise may also be used as the means for generating many parallel measurement beams of light, and as shown in FIG. 13, a microlens array 38 in which many small lenses 38a have been disposed crosswise, instead of the porous diaphragm plate 31, may also be used as the means for generating many parallel measurement beams of light.

The lens platform 13 mentioned above is disposed between the reflecting mirror 24 and the porous diaphragm plate 31, and a lens L to be inspected (mentioned later) is set on the projection 13b of the lens platform 13. The output (the detection result) of the two-dimensional CCD 34a of the TV camera 34 is inputted in an arithmetic control circuit (arithmetic control means) 35, and the output from the arithmetic control circuit 35 is inputted in an image processing circuit (image processing means) 36. The image processing circuit 36 controls a display unit (display means) 8 such as a monitor TV or a liquid crystal display unit from the arithmetic result of the arithmetic control circuit 35, and the outer diameter (the outer-diameter configuration) or a refractive characteristic state diagram of the lens to be inspected (the eyeglass lens) L is displayed on the display screen 3a of the display unit 3.

There will be explained a function of the lens meter having the aforementioned construction hereinafter.

(1) A pattern of an image which is thrown onto the screen 32

(a) In a case where the lens L does not disposed on the lens platform 13

In the illumination optical system 20, a measurement beam of light emitted from the light source 21 is guided to the collimator lens 23 through the diaphragm 22, is then made the parallel measurement beam of light through the collimator lens 23, and is then reflected toward the lens platform 13 by the reflecting mirror 24.

Figure 7A:
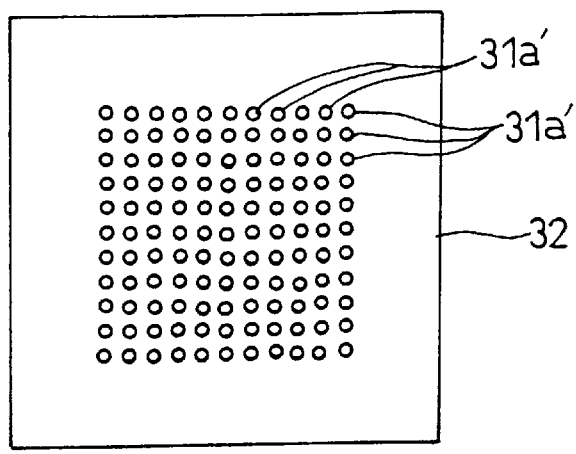
FIGS. 7(a), 7(b), 7(c) are explanatory diagrams showing patterns projected on the porous diaphragm plate shown in FIG. 1.

When the lens L is not kept being held on the lens platform 13, the measurement beam passes through the lens platform 13 and each minute diaphragm hole 31a of the porous diaphragm plate 31, and the pattern of thrown images 31a' of many minute diaphragm holes 31a is then formed on the screen 32. At this time, since the beam becomes parallel when having passed through many minute diaphragm holes 31a, as shown in FIG. 7(a). the size and the configuration of the pattern of the thrown images 31a' and those of the thrown images 31a' correspond to many minute diaphragm holes 31a.

(b) In a case where the lens L is disposed on the lens platform 13

When the lens L is kept being held on the lens platform 13, the parallel measurement beam passes through the porous diaphragm plate 31 after having been refracted through the lens L, and the pattern of the thrown images 31a' of many minute diaphragm holes 31a formed in the porous diaphragm plate 31 is then thrown onto the screen 32.

Figure 7B:
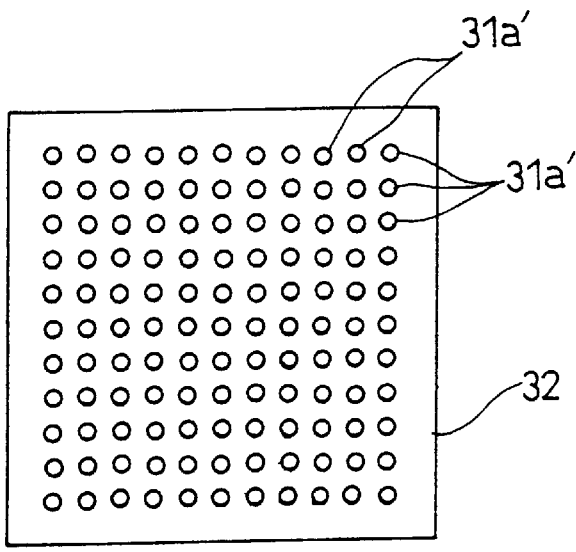
Figure 7C:
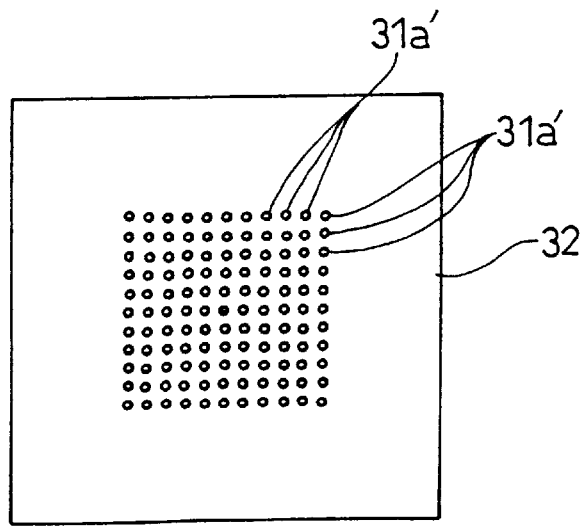
Figure 8A:
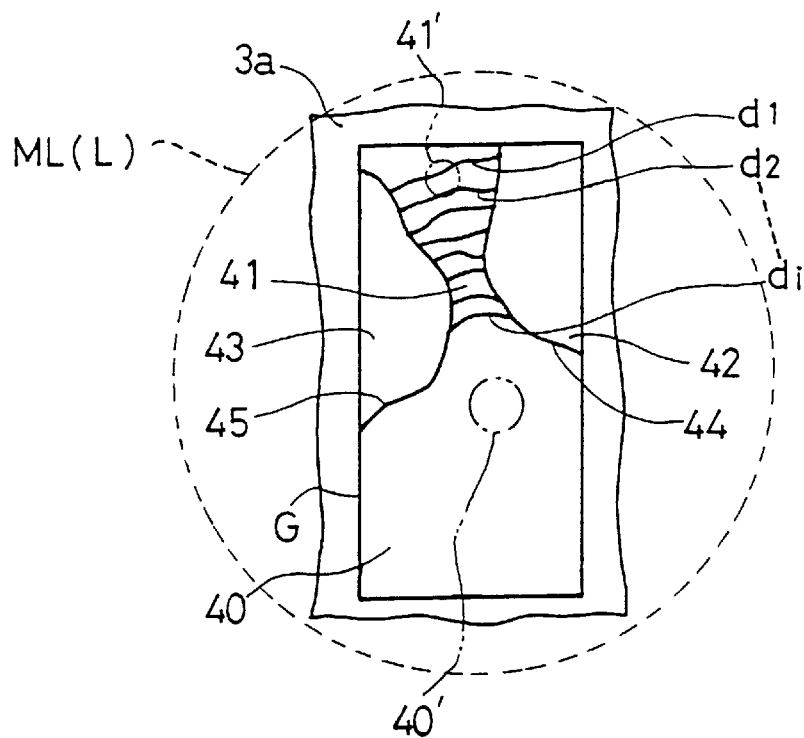
FIG. 8(a) is an explanatory diagram showing a display example of the refractive characteristics of an uncut lens (a lens to be cut).
Figure 8B:
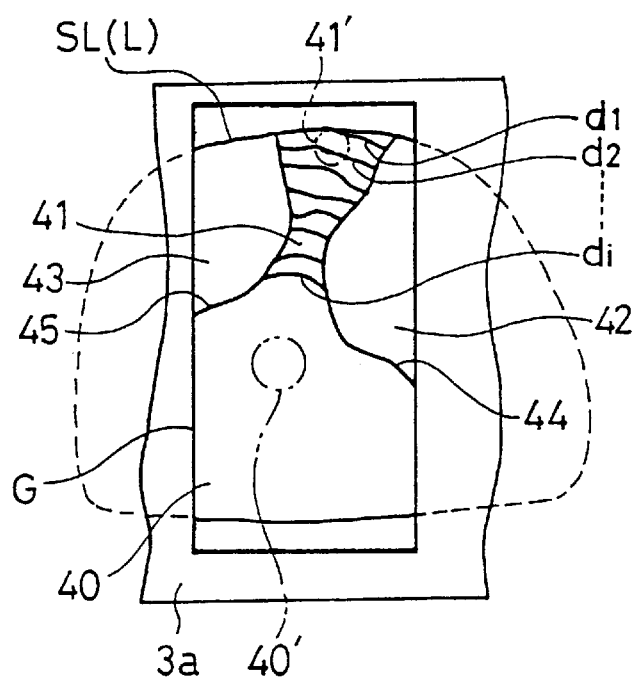
FIG. 8(b) is an explanatory diagram showing a display example of the refractive characteristics of the eyeglass lens framed in the spectacle frame.

At this time, in a case where the lens L is a spherical minus power lens, as shown in FIG. 7(b), the pattern of the minute diaphragm holes 31a of the porous diaphragm plate 31 is thrown onto the screen 32 with being enlarged. On the other hand, in a case where the lens L is a spherical plus power lens, as shown in FIG. 7(c), the pattern of the minute diaphragm holes 31a the porous diaphragm plate 31 is thrown onto the screen 32 with being made smaller.

In a case where the lens L is a progressive power lens, the measurement beam which has passed through many minute diaphragm holes 31a of the porous diaphragm plate 31 is refracted complexly and is then thrown onto the screen 32.

(2) Measurement of refractive characteristics

Next, in a case where the refractive characteristics of the lens L such as an eyeglass lens having an eyeglass lens configuration into which the circular lens ML to be cut, that is, the uncut lens (the lens blank) or the lens to be cut, has been ground are measured, the lens L is set on the lens platform 13. On the other hand, in a case where the optical characteristics of the lens L such as each eyeglass lens SL framed by the spectacle frame (the lens frame) LF of the spectacles (the eyeglasses) M shown in FIG. 5, are measured, the nose-appliers B of the spectacle frame LF are engaged with the nose-applier holding member 9, thereafter the nose-applier holding member 9 is moved in right and left directions and downward via the slider 9a, and the eyeglass leases SL are then held on (are brought into contact with) the projection 13b.

When the measurement starting switch 11 is turned on in this state, the measurement beam emitted from the light source 21 is guided to the collimator lens 23 through the diaphragm 22, is then made the parallel measurement beam through the collimator lens 23, and is then thrown onto the lens L which has been set on the lens platform 13 via the reflecting mirror 24. Then, the parallel measurement beam passes through the porous diaphragm plate 31 after having been refracted through the lens L, and the pattern of the thrown images 31a' of many minute diaphragm holes 31a which are formed in the porous diaphragm plate 31 is then thrown onto the screen 32.

The beam coming from the pattern of the measurement beam thrown onto the screen 32 in this way is incident upon the TV camera 34 through the relay lens 33, in short, the pattern of the measurement beam on the screen 32 is photographed by the TV camera 34 through the relay lens 33. Then, an image signal of the image of many minute diaphragm holes 31a which has been thrown onto the screen 32 is outputted from the area CCD 34a of the TV camera 34, and the outputted image signal is inputted in the arithmetic control circuit 35.

According to the image signal from the area CCD 34a of the TV camera 34, the arithmetic control circuit 35 can obtain the construction of the pattern of the minute diaphragm holes 31a of the porous diaphragm plate 31 which has been thrown onto the screen 32, that is, the difference of the disposition or the size of the pattern of the thrown images 31a' from that of the porous diaphragm plate 31, or the like.

The interval between each minute diaphragm hole 31a which has been thrown on the screen 32, that is, the interval between each thrown image 31a' varies with the refractive characteristics in each part of the lens L, so that the refractive power (the refractive characteristics) can be obtained according to the interval between each thrown image, or one of the refractive characteristics, that is, that the lens L does not have cylindrical power when the change of the interval is simply analogous and that the lens L has cylindrical power when the change of the interval is different depending upon the direction, or the like, can be detected.

In consideration of such a condition, therefore, the arithmetic control circuit 35 can obtain how the interval between each minute diaphragm hole 31a has varied with the refractive function of the lens L according to the image signal from the area CCD 34a of the TV camera 34, and can also obtain the refractive power, or the direction of the cylindrical axis, in each part (in each position) of the lens L, or the like.

In addition, the arithmetic control circuit 35 can obtain the part of the equal power according to the direction of the cylindrical axis, or the cylindrical power, in each part (in each position) of the lens L, which has obtained in the way mentioned above, and as shown in FIG. 9(b), the image processing circuit 36 can allow the display unit 3 to display the distribution of the equal power lines (a1, a2, . . . ai, . . . an), (a1', a2', . . . ai', . . . an') of the cylindrical axis on the display screen 3a.

Figure 9A:
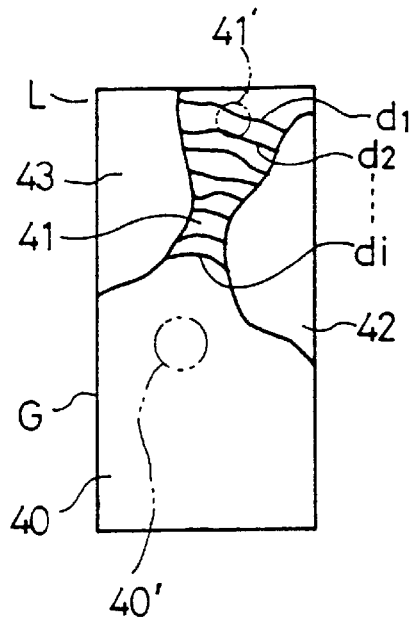
FIGS. 9(a) to 9(e), are explanatory diagrams showing images of the refractive characteristics of the lens which are obtained by an arithmetic control circuit and an image processing circuit.
Figure 9B:
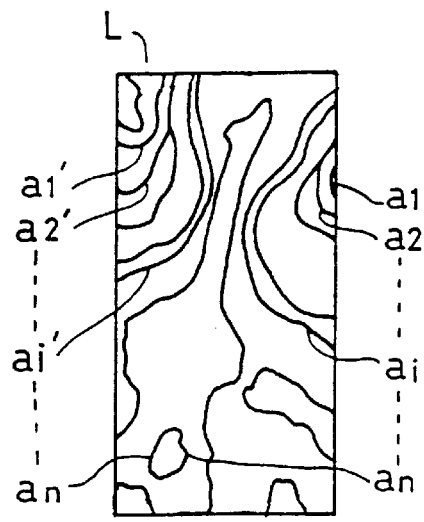
Figure 9C:
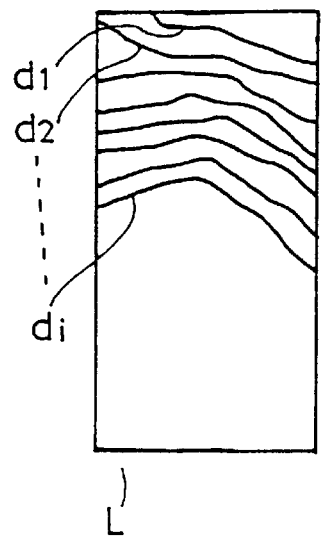

Besides, the arithmetic control circuit 35 can obtain the refractive power according to the change of the interval between each minute diaphragm hole 31a which has been thrown on the screen 32, and can also obtain the distribution of the equal power of the spherical power in each part (in each position) of the lens L, and as shown in FIG. 9(c), the image processing circuit 36 can allow the display unit 3 to display the distribution of the equal power lines (d1, d2, . . . di) of the spherical power on the display screen 3a.

Further, according to the distribution of the equal power lines of the cylindrical axis which has been obtained in the way mentioned above, as shown in FIG. 9(d), the arithmetic control circuit 35 can obtain boundary lines 44, 45 between an area including a distance portion 40 and a progressive portion 41 which is continuous to the distance portion 40, and each of side areas (distortion areas) 42, 43 on the right and left sides of the progressive portion 41 of the lens L. In short, since only ai, ai' of the equal power lines remain as the boundary lines, the boundary lines 44, 45 and the outer diameter (the outer-diameter configuration) La of the lens L can be displayed with overlapping to each other on the display screen 3a of the display unit 3 by means of the image processing circuit 36. Hereinafter, there will be described a method by which the boundary lines 44, 45 mentioned above are obtained. Herein, side areas 42, 43 are distortion areas except the distance portion 40, the progressive portion 41, and a near portion 41'. In FIG. 9(a), reference character 40' denotes a distance measurement portion of the distance portion 40, and reference character 41' denotes a near measurement portion whose circumferential portion is the near portion.

In short, the arithmetic control circuit 35 subtracts a cylindrical refractive characteristic value of the distance portion 40 from a cylindrical refractive characteristic value in each position within the boundary lines ai, ai', and each position where the subtracted refractive characteristic value is, for example, 0.25 is made each of the boundary lines 44, 45. In this case, the cylindrical refractive characteristic value is obtained in consideration of the cylindrical power and an inclined angle of the cylindrical axis.

Herein, for convenience, a case where the cylindrical power of the lens L is high over the entire lens L will be explained in FIGS. 10(a) to 10(c). A cylindrical refractive characteristic value C can be obtained by the following equation:

$$C = \sqrt{Cs \cdot \sin(2\theta si) - Ca \cdot \sin(2\theta a) + Cs \cdot \cos(2\theta si) - Ca \cdot \cos(2\theta a)} \quad (a)$$

Figure 10A:
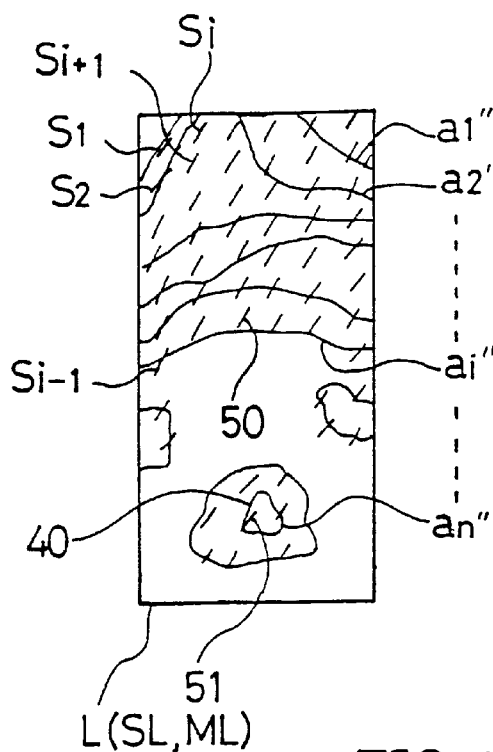
FIG. 10(a) is an explanatory diagram showing a cylindrical power distribution obtained in a case where the cylindrical power of the lens is large over the whole area thereof.
Figure 10B:
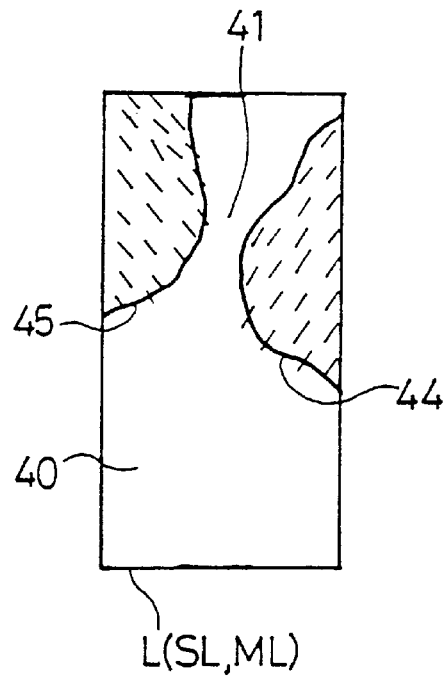
FIG. 10(b) is an explanatory diagram showing an image of a distance portion or a progressive portion which is obtained when an arithmetic process of the cylindrical power shown in FIG. 10(a) has been completed.
Figure 10C:
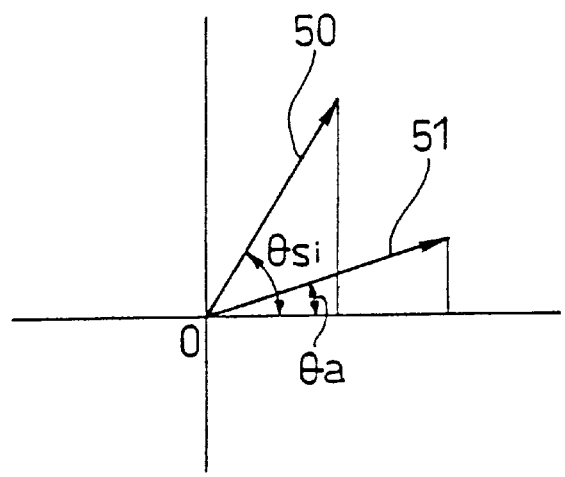
FIG. 10(c) is an explanatory diagram showing the angle of a cylindrical axis in FIG. 10(a).

Herein, θ si, as shown in FIG. 10(c), represents an angle of a cylindrical axis 50 in each position (S1, S2, . . . Si, . . . Sn) within a boundary line ai" shown in FIG. 10(a), Cs represents the cylindrical power in a position Si (i=0,1,2, . . . n), θ a represents an angle of a cylindrical axis 51 of an equal power line an" of the distance portion 40, and Ca represents the cylindrical power in the cylindrical axis 51. In a case where the cylindrical power of the lens L is relatively low, Ca·cos (θ a) may be regarded as 0 in almost all occasions because being equal to substantially 0 as being very small, or because being relatively small. Therefore, in this case, the cylindrical refractive characteristic value C is determined by Cs·cos (θ si), and thereby each position where the cylindrical refractive characteristic value C=Cs·cos (θ si)=0.25 becomes each of the boundary lines 44, 45.

Figure 9D:
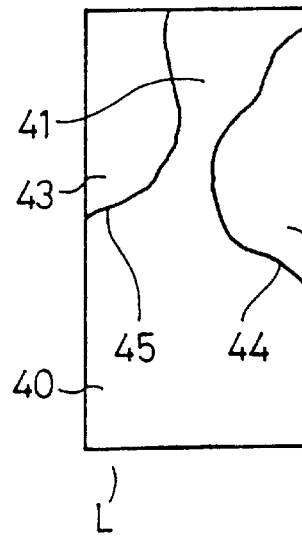
Figure 9E:
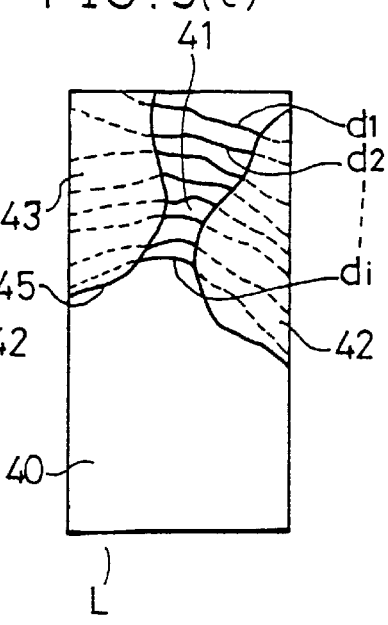

In a case where the image of FIG. 9(d) has been laid on that of FIG. 9(c), the arithmetic control circuit 35 eliminates each broken-line position drawn within the side areas 42, 43 of the equal power line distribution of the spherical power. Thereby, as shown in FIG. 9(a), the arithmetic control circuit 35 has the equal power line distribution of the spherical power distribution which has laid on the outer diameter and the boundary lines 44, 45 of the lens L displayed on the progressive portion 41. An image G shown in FIG. 9(a) is displayed on th(e display screen 3a of the display unit 3, as shown in FIGS. 1, 2, 8(a), and 8(b). Therefore, the areas of the distance portion 40 and the progressive portion 41, that is, the areas of each eyeglass lens to be practically used when a person wearing spectacles recognizes an object at view, and the change of the spherical power thereof, can be visually detected with ease.

Figure 6A:
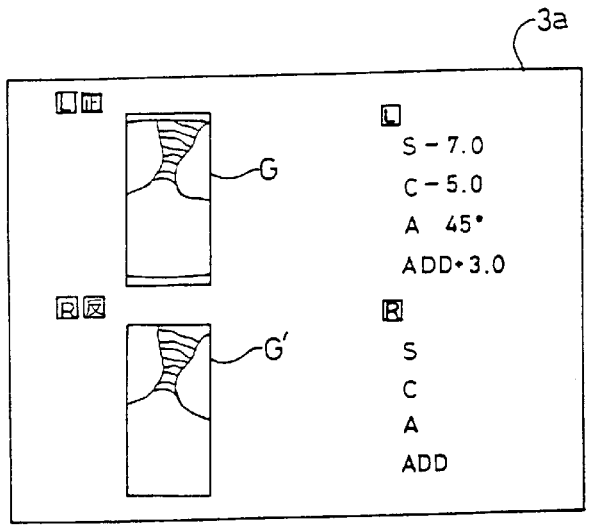
FIGS. 6(a), 6(b), 6(c) are front views of other variations of the display screen of the lens meter shown in FIG. 2.

Further, as shown in FIG. 6(a), the arithmetic control circuit 35 can make the display on the display screen 3a of the image G in a "plus" state which has been obtained in the measurement and a reversed image G' into which the image G has been reversed in a data processing operation, and can simultaneously make the display of the refractive characteristics S, C, A of "R", "L" of the right and left eyeglass lenses (eyeglass lenses) of spectacles, that is, spherical power S, cylindrical power C, cylindrical axial angle A, addition power ADD, and the like.

This type of display can be used, advantageously, in a case where one of the right and left eyeglass lenses (eyeglass lenses) of spectacles (eyeglasses) is broken and a new lens by which the broken eyeglass lens is replaced is produced. In this case, at first, the refractive characteristics of the "R" eyeglass lens or the "L" eyeglass lens which is not broken are measured, and then the refractive characteristics of "R" or "L" are displayed on the parts of "R", "L" shown in FIG. 6(a) as well as one of the refractive characteristic images G, G' ("R" in this embodiment) is displayed. According to data obtained in this operation, the name of a manufacturer and the number of a product are specified in search or the like, an uncut lens (a lens to be cut) for the other lens is selected, and the refractive characteristics of the selected uncut lens are measured in the same way as mentioned above. Then, the refractive characteristic image which is obtained in this measurement is reversed and is then displayed on the display screen 3a, and thereby an inclined direction of the progressive portion or the like of the other uncut lens is made the same direction as an inclined direction of the progressive portion of the refractive characteristic image of the unbroken eyeglass lens. As a result, it can be easily judged whether or not the direction to which the progressive portions of the right and left eyeglass lenses extend (an inclination of the progressive portion), that is, an inclination of the line which is defined by connecting the distance measurement portion to the near measurement portion, is in place (in balance).

Figure 6B:
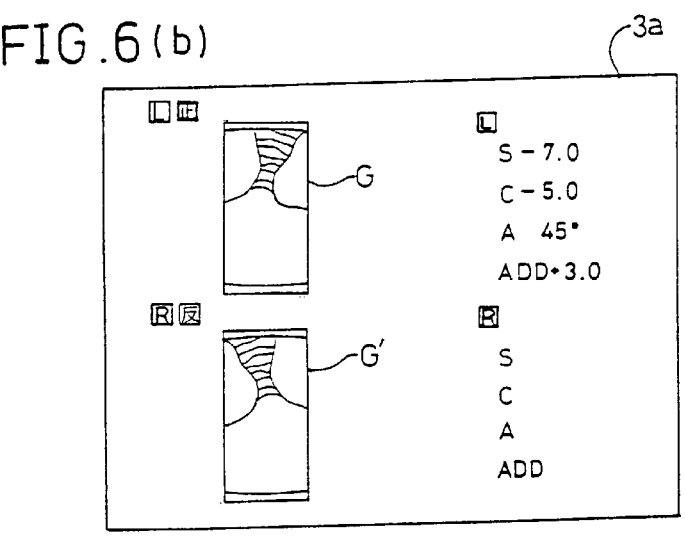

As shown above, in a case where one of the right and left eyeglass lenses (eyeglass lens) of spectacles (eyeglasses) is broken, the refractive characteristics of the "R" eyeglass lens or the "L" eyeglass lens which is not broken are measured, and then the refractive characteristics of "R" or "L" are displayed on the parts of "R", "L" shown in FIG. 6(a) as well as one of the refractive characteristic images G, G' is displayed, and as shown in FIG. 6(b), the refractive characteristics and the refractive characteristic image of the other are reversed in an image processing operation and is then displayed on the display screen 3a. According to the data obtained in this reverse processing operation, the name of a manufacturer and the number of a product are specified in search or the like, and in addition, data such as the inclination of the progressive portion which are used in a search processing operation can be obtained. Then, the refractive characteristics of the eyeglass lens which has been cut according to this data are measured before or after the eyeglass lens is set in a spectacle frame, the refractive characteristic value and the refractive characteristic image are then displayed on the display screen 3a, and the refractive characteristics and the refractive characteristic image of the unbroken eyeglass lens are then displayed. As a result, it can be easily judged whether or not the direction to which the progressive portions of the right and left eyeglass lenses extend (an inclination of the progressive portion), that is, an inclination of the line which is defined by connecting the distance measurement portion to the near measurement portion, is in place (in balance).

Figure 6C:
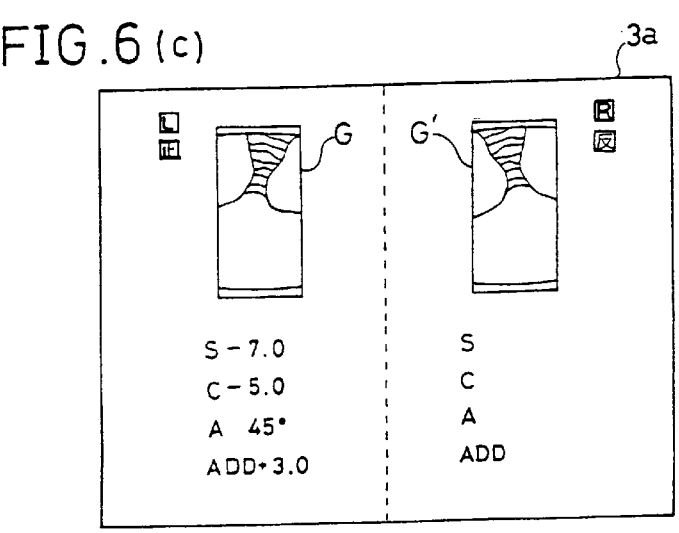

In FIGS. 6(a) and 6(b), the image G in the "plus" state and the image G' in the "reverse" state are displayed in the upper and lower parts on the display screen 3a, respectively. However, as shown in FIG. 6(c), the image G in the "plus" state and the image G' in the "reverse" state may also be displayed in the right and left parts on the display screen 3a, respectively, so that the eyeglass lenses can be disposed in positions closer to the real positions. According to this construction, it can be easily recognized whether or not an inclination of the progressive portion is in place.

Further, for example, the refractive characteristics of a lens to be inspected which has been ground into the configuration of a right lens and those of a lens to be inspected which has been ground into the configuration of a left lens are measured, as shown in FIGS. 6(a) and 6(b), the refractive characteristics of the right and left lenses are displayed in positions where "R" and "L" are displayed on the display screen 3a, respectively, and the refractive characteristic image G and the refractive characteristic image G' may also be displayed in the "plus" and in the "reverse", respectively. In this case, it can be easily judged whether or not the direction to which the progressive portions of the right and left eyeglass lenses extend (an inclination of the progressive portion), that is, an inclination of the line which is defined by connecting the distance measurement portion to the near measurement portion, is in place.

Further, according to the display of FIG. 6(c), in a case where the refractive characteristics of a customer's spectacles having a progressive portion are measured, the refractive characteristic images of the right and left eyeglass lenses can be displayed on the right and left parts, respectively, so that the refractive characteristic image of the right eyeglass lens can be easily compared with that of the left eyeglass lens. In this case, both refractive characteristic images of the right and left eyeglass lenses are left as they have been measured. Therefore, the display of L"plus", R"plus" is made, the refractive characteristic images of the right and left eyeglass lenses are then displayed according to the display of L"plus", R"plus", and refractive characteristic values of the right and left eyeglass lenses are then displayed below the refractive characteristic images.

Figure 11A:
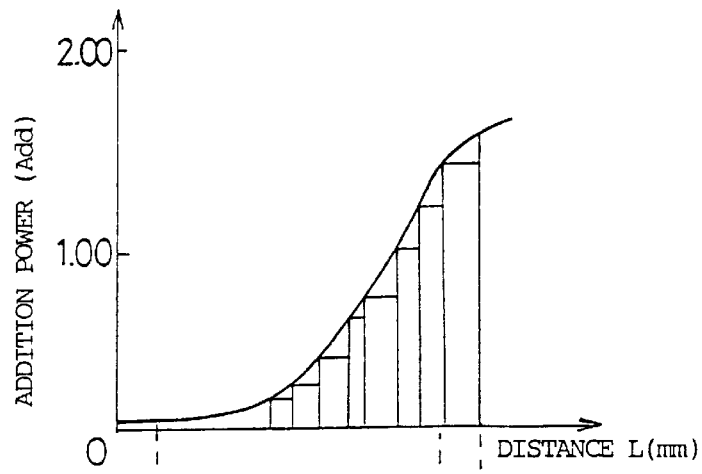
FIG. 11(a) is an explanatory diagram showing images of the refractive characteristics of the lens which are obtained by the arithmetic control circuit and the image processing circuit.
Figure 11A:
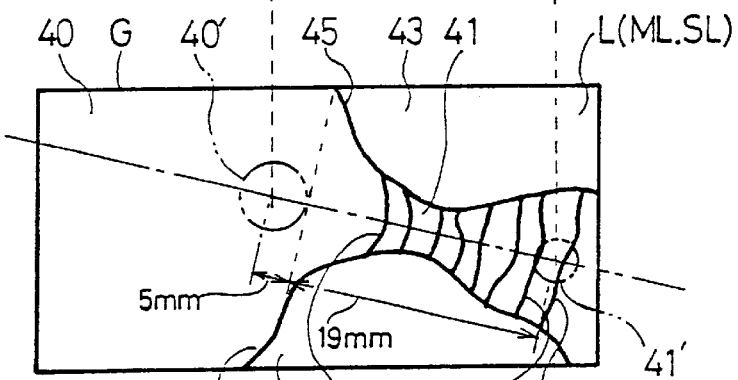
Figure 11B:
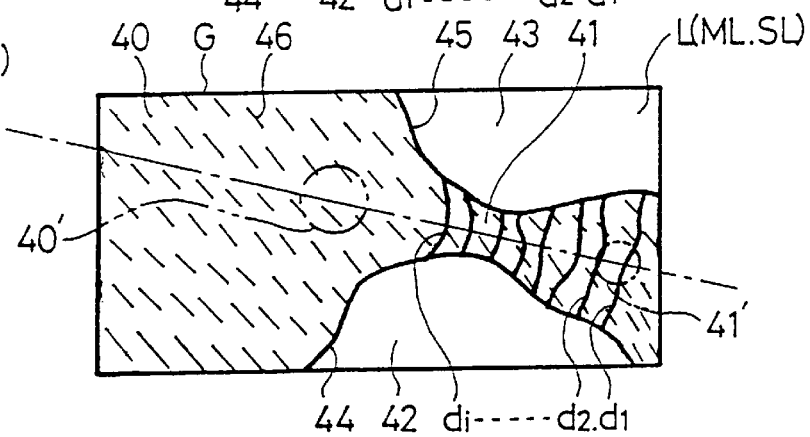
FIG. 11(b) is an explanatory diagram showing another display example of the image of the refractive characteristics of the lens shown in FIG. 11(a).

In this case, as shown in FIG. 11(a), there is provided a mode where the addition power in a distance point to the progressive portion 41 and in the near portion, as well as the image in FIG. 9(a), is displayed in parallel on the display screen 3a of the display unit 3. There is also provided a mode where a cylindrical axial line showing the direction of a cylindrical axis of each of the distance portion 40, the progressive portion 41, the near portion (the circumferential area including the near measurement portion 41'), and the like of the image shown in FIG. 9(a), is displayed on each portion. FIG. 11(b) shows an example according to which a cylindrical axial line 46 is displayed with being laid on the distance portion 40, the progressive portion 41, the near portion (the circumferential area including the near measurement portion 41') in this mode. Herein, addition power is a value which is obtained by subtracting the diopter of a distance portion from the diopter of a progressive portion (the reciprocal of a focal length). In this case, the position of the distance portion 40 and the progressive portion 41, and the change of the spherical power thereof, can be recognized more easily.

Switching of the image display shown in FIGS. 9(a) to 9(d) can be carried out by the operation of the switch 10 for switching modes.

Incidentally, the larger spherical power the lens L has, the larger thickness it has. Therefore, in a case where the spherical power of the lens L is made larger, the change of curvature in the progressive portion 41 tends to become larger and thus the cylindrical power of the progressive portion 41 tends to become larger. In this case, even though the equal power distribution of the cylindrical power of the lens L is obtained, the equal power distribution lines (a1, a2, . . . ai), (a1', a2', . . . ai') shown in FIG. 9(b) on both sides of the progressive portion 41, especially on or near areas ai, ai', becomes the equal power distribution lines (a1", a2", . . . ai". . . an") shown in FIG. 10(a) which are continuous to the right and left sides. Therefore, it has been difficult to obtain the boundary lines 44, 45 shown in FIG. 10(b) by which each of the side areas 42, 43 on the right and left sides of the progressive portion 41 can be distinguished.

Hence, in this case, the arithmetic control circuit 35 subtracts a cylindrical refractive characteristic value of the distance portion 40 from a cylindrical refractive characteristic value in each position within the boundary line ai" (substantially the lower half part in FIG. 10(a)), and each position where the subtracted refractive characteristic value is 0.25 as each of the boundary lines 44, 45 is obtained. In this case, the cylindrical refractive characteristic value is obtained in consideration of the cylindrical power and an inclined angle of the cylindrical axis.

In short, the cylindrical refractive characteristic value C can be obtained by the aforementioned equation (a).

$$C=\sqrt{Cs \cdot \sin(2\theta si) - Ca \cdot \sin(2\theta a) + Cs \cdot \cos(2\theta si) - Ca \cdot \cos(2\theta a)}$$

According to the cylindrical refractive characteristic value C, the equal power line distribution of the cylindrical power distribution is obtained again, as shown in FIG. 10(b), so that an image similar to that of FIG. 9(d) can be obtained. Then, a line between each position in which the cylindrical refractive characteristic value C, for example, becomes 0.25, that is, each position in which C becomes a value shown by the following equation, is drawn, so that each of the boundary lines 44, 45 can be obtained.

$$C=\sqrt{Cs \cdot \sin(2\theta si) - Ca \cdot \sin(2\theta a) + Cs \cdot \cos(2\theta si) - Ca \cdot \cos(2\theta a)} = 0.25$$

In the aforementioned embodiment, the configuration and the refractive characteristic value of a part (i.e., the progressive portion 41 and its circumference) of the lens L such as the uncut lens (the lens to be cut) or an eyeglass lens can be measured by the area CCD 34a of the TV camera 34.

However, the present invention is not necessarily limited to this construction. The refractive characteristics of the whole part of the lens L may also be measured.

As explained above, a lens meter according to the present invention comprises an illumination optical system for projecting a beam of measurement light onto a lens to be inspected, a light receiving optical system which is provided with a photosensor for detecting an amount in travel of the measurement beam which has passed through the lens, a display unit for displaying the refractive characteristics from a detection result of the light receiving optical system, and arithmetic control means for obtaining cylindrical refractive characteristic values in a distance portion of the lens in consideration of the cylindrical power and the direction of a cylindrical axis from a detection result of the photosensor, obtaining a cylindrical refractive characteristic value in a distortion area except the distance portion, a progressive portion continuing to the distance portion, a near portion, and the like of the lens in consideration of the cylindrical power and the direction of the cylindrical axis, subtracting the cylindrical refractive characteristic value in the distance portion from the obtained cylindrical refractive characteristic value in the distortion area, obtaining a boundary line between the distance portion, the progressive portion continuing to the distance portion, and the near portion, and the distortion area except these portions from the subtraction value, and allowing the display unit to display the boundary line. Therefore, this lens meter is capable of easily detecting a position or a configuration of a progressive portion and a near portion, and variations in the refractive characteristics of the progressive portion according to an image display even in a case where the treated astigmatic power of the lens is large.

Further, the arithmetic control means is also capable of obtaining the spherical power distribution in the progressive portion and the near portion from the detection result, and allowing the display unit to display the equal power lines of the spherical power distribution and the boundary line with overlapping to each other in the progressive portion and the near portion. According to this construction, a position or a configuration of a progressive portion and a near portion, and variations in the refractive characteristics of the progressive portion, can be easily detected according to an image display. In addition, even though a boundary line between the progressive portion or the distance portion and each side area varies slightly with each lens, the boundary line and the spherical power distribution of the progressive portion can be calculated precisely and then displayed. Therefore, it can be visually detected more precisely and more easily that the measured lens corresponds to a lens having predetermined characteristics.

Further, the arithmetic control means is also capable of obtaining the outer diameter of the lens from the output of the photosensor, and allowing the display unit to display the outer diameter of the lens, the equal power lines of the spherical power distribution, and the boundary line with overlapping to each other. In this case, even though an eyeglass lens the edge of which has been ground into an eyeglass lens configuration, as well as an uncut lens, is used, the lens configuration is not required to measure in advance, the outer diameter can be easily calculated and then displayed by a display unit when the refractive characteristics are measured, and the outer diameter and the spherical power lines or the progressive portion, and a position of the boundary line or the like, of the lens which are obtained in the way mentioned above, can be precisely displayed.

Further, the photosensor has a width of not being too small to receive the beam from the progressive portion and the circumferential part of the progressive portion of the lens. In this case, the boundary line between the progressive portion and the distance portion, and the side area of the progressive portion, and the spherical power distribution line can be obtained for a minimum of time period to be required and thus the required information can be obtained quickly in comparison with the measurement thereof over the whole area of the lens.

What is claimed is:

1. A lens meter comprising:

an illumination optical system for projecting a measurement light beam onto a lens to be inspected;

a light receiving optical system having a photosensor that detects the measurement light beam which has passed through the lens, the photosensor outputting a photosensor detection result;

a display unit for displaying refractive characteristics from said photosensor detection result; and arithmetic control means in which cylindrical refractive characteristic values of a distance portion of the lens are calculated based on the cylindrical power and a direction of a cylindrical axis, the cylindrical power and the direction of a cylindrical axis being transmitted to the arithmetic control means via said photosensor detection result, cylindrical refractive characteristic values in distortion areas except the distance portion, a progressive portion contiguous to the distance portion, and a near portion of the lens then being calculated based on the cylindrical power and the direction of the cylindrical axis, boundary lines between the distance, progressive, and near portions and the distortion areas except the distance, progressive, and near portions are then calculated from each obtained cylindrical refractive characteristic value of the distance portion, and said display unit is allowed to display the boundary lines.

2. A lens meter according to claim 1, wherein said arithmetic control means calculates a spherical power distribution in the progressive portion and the near portion from the detection results, and equal power lines of the spherical power distribution are displayed together with the boundary lines being superimposed on the progressive portion and the near portion.

3. A lens meter according to claim 2, wherein said arithmetic control means calculates an outer diameter of the lens from an output of said photosensor, and the outer diameter of the lens is displayed together with the equal power lines of the spherical power distribution and the boundary lines being superimposed on each other.

4. A lens meter according to claim 1, wherein said photosensor has a width sufficient to receive rays of light at least from the progressive portion and a circumferential part of the progressive portion of the lens.

* * * * *